United States Patent
Kuehne

(10) Patent No.: US 9,684,166 B2
(45) Date of Patent: Jun. 20, 2017

(54) MOTOR VEHICLE AND DISPLAY OF A THREE-DIMENSIONAL GRAPHICAL OBJECT

(71) Applicant: AUDI AG, Ingolstadt (DE)

(72) Inventor: Marcus Kuehne, Beilngries (DE)

(73) Assignee: AUDI AG, Ingolstadt (DE)

( * ) Notice: Subject to any disclaimer, the term of this patent is extended or adjusted under 35 U.S.C. 154(b) by 36 days.

(21) Appl. No.: 14/706,530

(22) Filed: May 7, 2015

(65) Prior Publication Data

US 2015/0323789 A1    Nov. 12, 2015

(30) Foreign Application Priority Data

May 8, 2014    (DE) .................. 10 2014 006 724

(51) Int. Cl.
 *G02B 27/14* (2006.01)
 *G02B 27/01* (2006.01)
(Continued)

(52) U.S. Cl.
 CPC .......... *G02B 27/0101* (2013.01); *B60K 35/00* (2013.01); *G02B 27/01* (2013.01);
(Continued)

(58) Field of Classification Search
 CPC ............ G02B 27/0101; G02B 27/0172; G02B 2027/0138; G02B 27/017; G02B 27/0093;
(Continued)

(56) References Cited

U.S. PATENT DOCUMENTS 5,629,806 A * 5/1997 Fergason ............. G02B 27/026
                                                                    359/630
5,712,732 A * 1/1998 Street ................. G02B 27/0093
                                                                  348/E13.004
(Continued)

FOREIGN PATENT DOCUMENTS

DE          4207284          9/1993
DE           443305          3/1996
(Continued)

OTHER PUBLICATIONS

German Office Action for German Priority Patent Application No. 10 2014 006 724.6, mailed Jan. 27, 2015, 6 pages.

*Primary Examiner* — Ricky Mack
*Assistant Examiner* — Daniele Manikeu
(74) *Attorney, Agent, or Firm* — Staas & Halsey LLP

(57) ABSTRACT

A display apparatus displays a three-dimensional graphical object. The display apparatus includes a projection device for producing an autostereoscopic projection image of the object. The object is displayed for a viewer such that the viewer has an improved three-dimensional impression from the representation. The display apparatus to this end has a specularly reflective and light-transparent combiner plate, and the projection device is configured to project the projection image onto the combiner plate such that for a viewer, viewing from a predetermined viewing direction through the combiner plate, the projection image appears as a mirror image on the combiner plate.

18 Claims, 1 Drawing Sheet

(51) Int. Cl.
*B60K 35/00* (2006.01)
*G02B 27/22* (2006.01)
*H04N 13/04* (2006.01)
*H04N 13/02* (2006.01)
*H04N 13/00* (2006.01)

(52) U.S. Cl.
CPC ......... *G02B 27/22* (2013.01); *H04N 13/0275* (2013.01); *H04N 13/04* (2013.01); *H04N 13/044* (2013.01); *H04N 13/0059* (2013.01); *H04N 2213/003* (2013.01)

(58) Field of Classification Search
CPC ...... G02B 2027/013; G02B 2027/0134; G02B 2027/0159; G02B 27/2228; G02B 27/0179
USPC ....... 359/630, 13; 345/8, 633, 156; 348/148, 348/115, 53, 78
See application file for complete search history.

(56) References Cited

U.S. PATENT DOCUMENTS

| | | | |
|---|---|---|---|
| 6,791,570 | B1 | 9/2004 | Schwerdtner et al. |
| 7,460,305 | B2* | 12/2008 | Powell ................... G02B 13/22 348/E9.026 |
| 2007/0183055 | A1* | 8/2007 | Maliah ............... G02B 27/0149 359/632 |
| 2010/0014053 | A1* | 1/2010 | Brentnall, III ..... G02B 27/2292 353/7 |
| 2014/0043689 | A1* | 2/2014 | Mason ............... G02B 27/0101 359/630 |

FOREIGN PATENT DOCUMENTS

| | | |
|---|---|---|
| DE | 10302387 | 8/2004 |
| DE | 102005058018 | 6/2007 |
| DE | 10 2014 006 724.6 | 5/2014 |
| EP | 946895 | 8/2002 |
| WO | 2009/018381 | 2/2009 |

\* cited by examiner

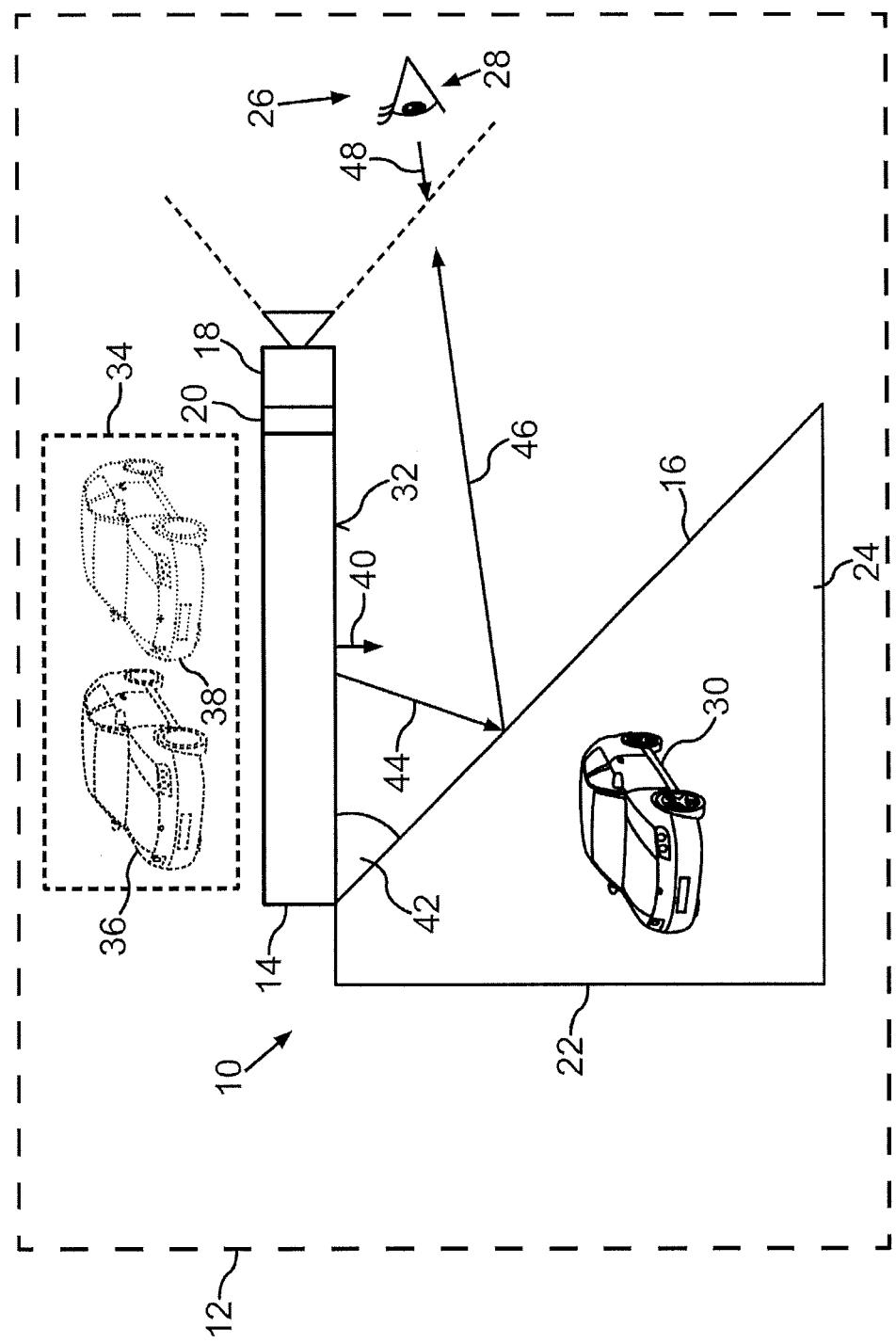

MOTOR VEHICLE AND DISPLAY OF A THREE-DIMENSIONAL GRAPHICAL OBJECT

CROSS REFERENCE TO RELATED APPLICATIONS

This application is based on and hereby claims priority to German Application No. 10 2014 006 724.6 filed on May 8, 2014, the contents of which are hereby incorporated by reference.

BACKGROUND

The invention relates to a display apparatus for displaying a three-dimensional graphical object. This representation is based on an autostereoscopic projection image of the object. Part of the invention are also a motor vehicle in which the display apparatus is provided, and a method for displaying the three-dimensional graphical object.

A projection device configured as a screen for producing an autostereoscopic representation of a three-dimensional graphical object, producing a representation with a depth effect, is disclosed, for example, in DE 44 33 058 A1. Generally, an autostereoscopic representation of a three-dimensional graphical object is brought about by producing a different image of the object in each case for the right eye and the left eye of a viewer and by guiding each image only to that eye for which it is intended using a deflection device or blocking device. The two images here represent the object in each case from a slightly different viewing angle such that consequently the stereoscopic representation that is important for three-dimensional vision is produced. The above-mentioned document describes for this purpose how the deflection device can be mechanically moved in front of the screen in order to compensate for a head movement of the viewer.

Capturing a head movement is also described in DE 42 07 284 A1 with respect to controlling a 3D display using liquid-crystal shutter glasses for producing a stereoscopic representation.

EP 0 946 895 B1 describes a plurality of deflection or screening apparatuses mentioned for the autostereoscopic representation.

A parallax barrier of strip-shaped, opaque lamellae and a lens array and a prism array, which are both designed for location-selective deflection of the light emitted by the screen to the two eyes, are shown.

A lens array and an associated configuration of an LCD screen for adaptation to the lens array are disclosed in WO 2009/018381 A2.

SUMMARY

One possible object relates to displaying a three-dimensional graphical object for a viewer such that said viewer obtains a spatial impression from the representation, that is to say a 3D representation of the object.

The inventor proposes a display apparatus for displaying the three-dimensional graphical object has, in the manner described, a projection device for producing an autostereoscopic projection image of the object. In the projection device, a lens array or a prism array or a parallax barrier can be provided, in the known manner, for producing the autostereoscopic effect.

In contrast to the related art, no provision is made for the viewer to view the projection device directly, that is to say for example the screen thereof on which the 3D representation of the object is produced. Instead, the display apparatus includes a specularly reflective and light-transparent combiner plate. Such combiner plates are known for example from head-up displays. In such a display, provision is made for the viewer to view the free space behind the combiner plate through said combiner plate, which is possible owing to the light transparency of the combiner plate. The plate is oriented at an angle with respect to the viewing direction of the viewer. Specularly reflected in the plate is therefore the image of a projection device which is arranged laterally with respect to the viewing direction and which displays, for example, scales or measurement values such that they are viewable by the viewer as a mirror image on the combiner plate and appear, for the viewer, to float in the free space behind the plate.

In the proposed display apparatus proposed by the inventor, the projection device is designed to project the autostereoscopic projection image onto the combiner plate such that the projection image of the object appears as a mirror image on the combiner plate for a viewer looking from a predetermined viewing direction through the combiner plate. In other words, the three-dimensional graphical object appears therefore to float in the free space behind the combiner plate. Since the projection image is an autostereoscopic projection image, the 3D effect of the autostereoscopic projection image is combined with the impression of the floating image as is produced by the combiner plate. Trials have shown that on account of this subjects experience a significant improvement of the 3D impression of the representation. The reason therefor appears to be an illusion which is based on the viewer also seeing, through the combiner plate, the background located therebehind together with the representation which is floating in the space, and thereby an improved spatial perception results on account of the cognitive processing of said image impression.

With particular preference, at least one display device is provided in a motor vehicle. Such a motor vehicle is likewise the subject matter of the proposals. The motor vehicle having the at least one display apparatus according to one embodiment of the display apparatus is preferably configured as an automobile, in particular as a passenger car.

The combiner plate of the proposed display apparatus can be arranged, by way of example, in front of a hollow space, that is to say a closed space which is delimited towards one side by the combiner plate. For this purpose, a corresponding embodiment of the motor vehicle makes provision for in each case one combiner plate of the at least one display apparatus to be arranged in an instrument cluster and/or an infotainment system of the motor vehicle. This leads to the advantage that the viewer has the impression that the three-dimensional graphical object appears to float within the closed hollow space in the instrument cluster or in the infotainment system.

However, the combiner plate can also be arranged in the field of vision of the viewer when viewing the surrounding traffic. To this end, one embodiment of the motor vehicle makes provision for a head-up display to be provided by using a combiner plate of the at least one display apparatus. This can be used to overlay three-dimensional representations of objects in the field of vision of the viewer while the viewer views the surrounding environment of the motor vehicle.

The inventor also proposes a method for displaying the three-dimensional graphical object, which comes about through the operation of the display apparatus. The autostereoscopic projection image of the object is produced by the projection device, and said projection image is emitted largely or entirely toward the specularly reflective and light-transparent combiner plate. In other words, therefore, the projection device projects the projection image onto the combiner plate. The combiner plate at least partially specularly reflects the projection image, depending on the reflectance thereof or the transparency thereof, toward the viewer such that, for the viewer, the projection image appears as a mirror image on the combiner plate.

Further developments in conjunction with the proposed display apparatus are described below. The features of the further developments, however, also further develop both the proposed motor vehicle and the proposed method.

According to one embodiment, the projection device has a screen on which the autostereoscopic projection image is produced. According to this embodiment, a screen plane of the screen and a plate plane of the combiner plate enclose an angle of 35 degrees to 65 degrees, in particular 40 degrees to 50 degrees. This leads to the advantage that the screen image is perceived by the viewer on the combiner plate as a mirror image with only negligible distortions.

The combiner plate is preferably made of glass and/or foil. Glass has the advantage that, owing to its inherent stiffness, it will not oscillate even in the case of vibrations, as can occur for example in a motor vehicle, and therefore distortions of the projection image due to oscillations of the combiner plate are avoided. A foil has the advantage that it is particularly lightweight. In addition, the choice of the foil material can be used to adjust the light transparency or the mirror characteristic with little outlay.

A further improvement of the 3D effect comes about according to a particularly preferred embodiment, in which the position of the viewer is captured and said position influences the representation such that this even brings about a holographic effect, that is to say that for the viewer a spatially fixed three-dimensional object appears behind the combiner plate. To this end, a capturing device is provided which is adapted to produce positional data that indicate a position of the viewer, that is to say for example a position of the viewer's head or the viewer's eyes. A control device is adapted to control the projection device in dependence on the positional data such that the representation of the object maintains a virtual spatial position as the position of the viewer changes. In other words, therefore, the viewer can, for example, move his/her head to and fro, and, in the process, a representation of the object is moved in dependence on the current position of the head and/or the eyes such that, from the viewer's view, the object appears to remain without movement at a predetermined position behind the combiner plate. Thereby, two effects can be achieved using the control device. First, provision may be made for only an artificial parallax to be produced, as would result if the object were to be located at a specific location behind the combiner plate in front of a background. Additionally, provision may be made for the viewing angle at which the object is represented to also be configured to be dependent on the positional data, that is to say the user can move his head around the object. By way of example, it is therefore possible for a movement of the head to the right to be converted by the control device to the effect that the object is represented to have been slightly rotated, for instance as if the viewer in fact is moving his head around a plastic figure. The functional relationship between positional data and corresponding changes of the representation to achieve said holographic effect can be ascertained by simple trials or by geometric calculations.

For capturing the position of the viewer, according to one further development of this embodiment, at least one camera is provided which films the head of the viewer. From the image data it is possible to ascertain both the head position and advantageously the face normal, that is to say a normal vector perpendicular to the face plane, and in a particularly advantageous manner also the alignment of the eyes.

Even more advantageously, a relationship between the position of the viewer and the representation can be produced if the capturing device has an eye tracker. This can be used to ascertain both the position of each eye and its viewing axis and to match the representation of the object correspondingly precisely to the current position.

BRIEF DESCRIPTION OF THE DRAWINGS

These and other objects and advantages of the present invention will become more apparent and more readily appreciated from the following description of the preferred embodiments, taken in conjunction with the accompanying drawing of which:

The sole FIGURE (FIG.) shows a schematic sectional illustration of a potential embodiment of the proposed display apparatus.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

The exemplary embodiment explained below is a preferred exemplary embodiment. In the exemplary embodiment, however, the described components of the embodiment represent in each case individual features which are to be regarded independently from one another and which further develop the proposals in each case also independently of one another and should therefore also be considered individually or as a component part in a different combination than that shown. The described embodiment furthermore can also be supplemented by further features of the already described features.

The figure shows a display apparatus 10, which can be fitted for example in a motor vehicle 12, for example a passenger car. By way of example, the display apparatus 10 can be a component part of an instrument cluster or infotainment system of the motor vehicle 12. The display apparatus 10 can also be a component part of a head-up display.

The display apparatus 10 comprises, in the example shown, a projection apparatus 14, a refraction surface or combiner plate or in short plate 16, a capturing device 18, a control device 20 and a background surface 22. The background surface 22 and the plate 16 can delimit a space 24. In the case that the display apparatus 10 is configured as a head-up display, the display apparatus 10 does not have a background surface, but a surrounding environment of the motor vehicle 12 forms a background.

The figure illustrates only one eye 28 of a viewer 26 of the display apparatus 10. The viewer 26 uses the display apparatus 10.

The projection device 14 can be a lenticular 3D display or generally be a screen for autostereoscopic representation of an object 30. In the example shown, a three-dimensional representation of a motor vehicle is intended to be displayed to the viewer 26 using the display apparatus 10 for example as the graphical object 30.

On a screen surface 32 of the projection apparatus 14, an autostereoscopic representation 34 of the object 30 is produced for a left eye from a left-hand image 36 and for a right eye of the viewer 26 from a right-hand image 38. For the sake of clarity, the representation 34 is illustrated above the projection device 14. The two representations 36, 38 are here drawn to be further apart than is actually the case in stereoscopic representation.

In the figure, the surface normal 40 of the screen plane 32 faces in the direction of the plate 16. A plate plane of the plate 16 extends perpendicular to the image plane of the figure. The plate plane of the plate 16 encloses with the screen plane 32 an angle 42, which is between 35 degrees and 65 degrees, in particular between 40 degrees and 50 degrees. The angle is preferably 42 to 45 degrees.

The plate 16 is see-through such that the viewer 26 can recognize the background surface 22 through the plate 16. The representation 34 is projected from the screen plane 32 as a projection image in a projection direction 44 toward the plate 16, and is reflected there in the direction toward the eye 28 along a display direction 46. The reflection at the plate 16 can be brought about as a foil and/or glass pane reflection. In the opposite direction to the display direction 46, a designated viewing direction 48 is produced, from which the viewer 26 views the plate 16 with his eye 28.

To the viewer 26, the specular reflection of the projection image 34 appears as an illusion, as if the three-dimensional object 30 appears to float in the space 24 in front of the background surface 22. The combination of the autostereoscopic representation through the projection device 14 and the reflection at the plate 16 in front of the background surface 22 here improves the 3D effect or 3D impression as compared to a direct viewing of the screen plane 32.

If the viewer 26 moves his head, the projection image 34 can be changed such that, for the viewer 26, the object 30 appears to maintain its position within the space 24. In other words, the movement of the head is compensated. To this end, the capturing device 18, for example a 2D camera or 3D camera, can be used to capture the position of the viewer 26, in particular the viewer's head position, preferably the viewer's viewing direction with the eye 28 and/or the other eye. The control device 20 couples the capturing device 18 to the projection device 14. The control device 20 can be, by way of example, a controller or a program module in a processor device or a controller. The control device 20 controls the projection device 14 in the described manner to compensate for the head movement. By capturing the exact position of the viewer and thus influencing the representation of the object 30, that is to say of the projection image 34, a regular holographic effect comes about in the representation of the object 30 in the space 24. From the view of the viewer 26, a 3D image of the object appears to float in a spatially fixed position in the space 24.

Overall, the example shows how a 3D image can be produced which appears to float, from the viewer's view, freely in the space and how a hologram as a virtual plastic body maintains its position in the space even if a head moves. In particular, a lenticular 3D display is used herefor, which produces a 3D image without glasses. By combining this 3D effect of the display with the floating image, as is produced by way of reflection at the plate 16, the 3D impression is significantly improved.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A display apparatus to display a three-dimensional graphical object, comprising:
   a specularly reflective and light-transparent combiner plate; and
   a projection device to produce an auto-stereoscopic projection image of the object and to project the projection image onto the combiner plate such that for a viewer, viewing from a predetermined viewing direction through the combiner plate, the projection image appears as a mirror image on the combiner plate, wherein
   the combiner plate lies at least partially within a plate plane, and
   both the projection device and the viewer are located on the same side of the plate plane.

2. The display apparatus according to claim 1, wherein the projection device has a lens array or a prism array or a parallax barrier.

3. The display apparatus according to claim 1, wherein
   the combiner plate lies at least partially within the plate plane,
   the projection device has a screen with a screen plane, and
   the plate plane and the screen plane enclose an angle of 35° to 65°.

4. The display apparatus according to claim 1, wherein
   the combiner plate lies at least partially within the plate plane,
   the projection device has a screen with a screen plane, and
   the plate plane of the combiner plate and the screen plane enclose an angle of 40° to 50°.

5. The display apparatus according to claim 1, wherein the combiner plate is made of at least one of glass and foil.

6. The display apparatus according to claim 1, further comprising:
   a capturing device to produce positional data which indicate a position of the viewer; and
   a control device to control the projection device in dependence on the positional data such that the projection image maintains a virtual spatial position for the object if the position of the viewer changes.

7. The display apparatus according to claim 6, wherein the capturing device has a 2D or 3D camera.

8. The display apparatus according to claim 6, wherein the capturing device has an eye tracker to track a viewing axis for eyes of the viewer.

9. The display apparatus according to claim 6, wherein the control device controls the projection device such that the object appears to rotate as the position of the viewer changes.

10. The display apparatus according to claim 1, wherein
    a background surface is provided behind the combiner plate such that the combiner plate is between the background surface and the viewer,
    a space is formed between the background surface and the combiner plate, and
    the projection image is represented such that the object appears to the viewer floating in the space formed between the background surface and the combiner plate.

11. The display apparatus according to claim 10, wherein the background surface is at least partially visible through the combiner plate.

12. The display apparatus according to claim 1, wherein
the projection device has a screen on which the projection image is produced, and
the combiner plate is provided at an angle with respect to the viewing direction such that the projection image on the screen is specularly reflected by the combiner plate to the viewer.

13. A motor vehicle comprising the display apparatus according to claim 1.

14. The motor vehicle according to claim 13, wherein the combiner plate of the display apparatus is arranged in an instrument cluster of the motor vehicle.

15. The motor vehicle according to claim 13, wherein the combiner plate of the display apparatus is arranged in an infotainment system of the motor vehicle.

16. The motor vehicle according to claim 13, wherein a head-up display is provided by the combiner plate of the display apparatus.

17. A method for displaying a three-dimensional graphical object, comprising:

producing an autostereoscopic projection image of the object by a projection device;

emitting the projection image from the projection device, to a specularly reflective and light-transparent combiner plate; and at least partially specularly reflecting the projection image to a viewer by the combiner plate such that, for the viewer, the projection image appears as a mirror image on the combiner plate, wherein the combiner plate lies at least partially within a plate plane, and both the projection device and the viewer are located on the same side of the plate plane.

18. The display apparatus according to claim 1, wherein a projection device comprises a lenticular 3D display.

\* \* \* \* \*